Nov. 16, 1926.
H. NIELSEN
CHUCK
Filed Jan. 2, 1926
1,606,972
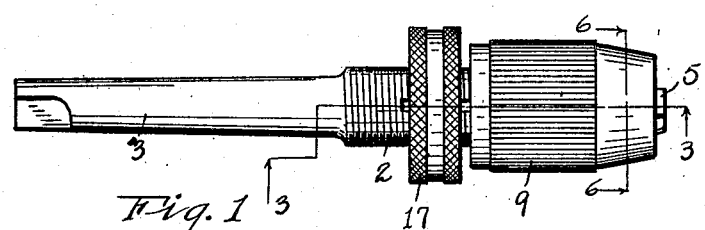
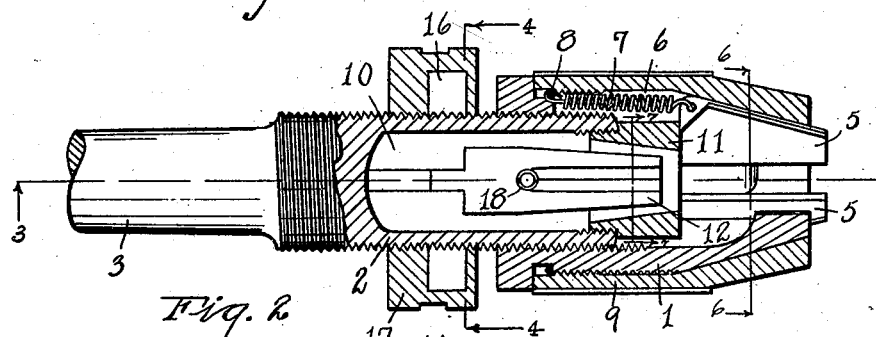
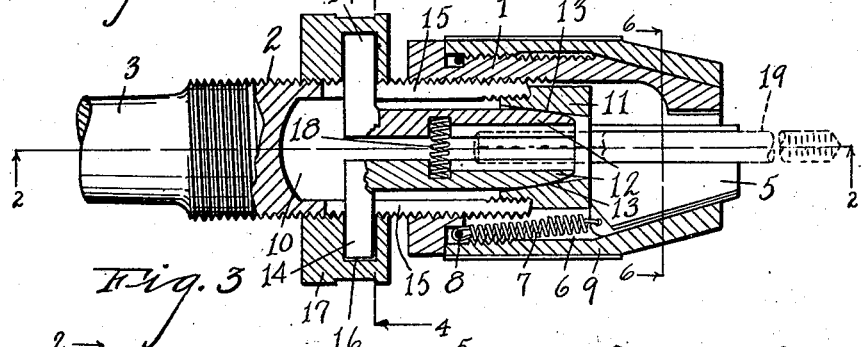
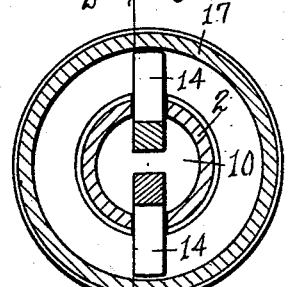
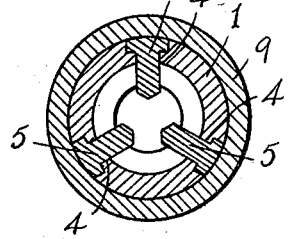
INVENTOR
Holger Nielsen
BY Chappell & Earl
ATTORNEYS Patented Nov. 16, 1926.

1,606,972

UNITED STATES PATENT OFFICE.

HOLGER NIELSEN, OF LAWTON, MICHIGAN, ASSIGNOR TO NIELSEN-BARTON CHUCK & TOOL COMPANY, OF LAWTON, MICHIGAN.

CHUCK.

Application filed January 2, 1926. Serial No. 78,910.

The main object of this invention is to provide an improved chuck for taps and the like by which the taps are very securely held, effectively centered relative to the axis of rotation of the chuck and effectively holds the tool on reversing or retracting rotation.

Objects relating to details and economies of construction and operation of my invention will definitely appear from the detailed description to follow.

The invention is clearly defined and pointed out in the claims.

A structure which is a preferred embodiment of my invention is clearly illustrated in the accompanying drawing, forming a part of this application, in which:

Fig. 1 is a side elevation of my improved chuck.

Fig. 2 is a detail view mainly in longitudinal section on a line corresponding to line 2—2 of Figs. 3 and 4.

Fig. 3 is a detail view mainly in longitudinal section on a line corresponding to line 3—3 of Fig. 2, a tap being indicated in the chuck.

Fig. 4 is a transverse section on a line corresponding to line 4—4 of Figs. 2 and 3.

Fig. 5 is a perspective view of one of the supplemental jaws.

Fig. 6 is a sectional view on line 6—6 of Fig. 3.

Fig. 7 is a sectional view on a line corresponding to line 7—7 of Fig. 2 showing the jaws engaging a tap.

In the drawing similar reference characters refer to similar parts throughout the several views, and the sectional views are taken looking in the direction of the little arrows at the ends of the section lines.

Referring to the drawing, my improved chuck comprises a main body member 1 and a supplemental body member 2, the supplemental body member being threaded into the main body member and provided with a shank 3.

The main body member has ways 4 for the jaws 5 and slots 6 extending upwardly from these ways. These slots receive springs 7 for retracting the jaws, the springs being engaged with a ring 8.

The shell 9 is threaded upon the body member 1, the lower end being tapered to fit the tapered lower end of the body member and to support the jaws in their ways so that when the body member 1 is screwed upwardly on the body member 2, the jaws are forced to clamping position and vice versa. In the embodiment illustrated, the main function of the jaws 5 is that of centering the tap.

The body member 2 has a jaw chamber 10 with an internally tapered extension 11 at its outer end for supporting the supplemental jaws 12 which drive the tool. This extension 11 also constitutes a thrust member for the jaws 5.

The jaws 12 have tapered ends 13 coacting with the tapered walls of the member 11 and lugs 14 disposed through slots 15 in the body member 2 to engage the internal annular groove 16 in the collar 17 which is threaded upon the body member 2 so that by adjustment of this collar the jaws 12 are opened and closed, the spring 18 between the jaws serving to open them as the jaws are carried rearwardly by adjustment of the collar.

The tool 19 is arranged so that it is engaged by both sets of jaws, the end of the tool being squared while the jaws 12 are shaped to provide driving engagement therewith. The jaws being independently clamped thereon provide a very secure grip therefor so that it is securely retained and aligned with the axis of the shank and so that it cannot wobble or move in the jaws and a positive driving engagement is had both for advancing and retracting the tap.

My improved chuck is especially designed by me for use in tapping machines where there has been a very great loss in breakage owing to the taps not being securely held and not properly aligned. My improved chuck is very efficient for the purpose; at the same time the taps may be quickly released or secured, both the main body and the collar 17 being grasped at the same time if desired.

The terms "main" and "supplemental" are used herein mainly for convenience in description.

Having thus described my invention, what I claim as new and desire to secure by Letters Patent, is:

1. In a chuck, the combination of a main body member tapered at its outer end and having jaw ways in its tapered portion, a slotted supplemental body member threaded into said main body member and provided with a shank, jaws arranged in said ways in said main body member, an internally tapered jaw supporting shell threaded upon said main body member, supplemental jaws disposed in said supplemental body member and provided with lugs projecting through its said slots, an internally tapered supporting member for said supplemental jaws threaded into the outer end of said supplemental body member and constituting a thrust member for said jaws in said main body member, an adjusting collar threaded upon said supplemental body member and having an internal annular groove engaging the lugs of said supplemental jaws, and a spring acting to normally separate said supplemental jaws.

2. In a chuck, the combination of a main body member tapered at its outer end and having jaw ways in its tapered portion, a slotted supplemental body member threaded into said main body member and provided with a shank, jaws arranged in said ways in said main body member, an internally tapered jaw supporting shell threaded upon said main body member, supplemental jaws disposed in said supplemental body member and provided with lugs projecting through its said slots, an internally tapered supporting member for said supplemental jaws threaded into the outer end of said supplemental body member, and an adjusting collar threaded upon said supplemental body member to coact with the lugs of said supplemental jaws.

3. In a chuck, the combination of a main body member and a supplemental body member projecting into the inner end of said main body member and having side openings, a set of main jaws arranged in said main body member below said supplemental body member, means for actuating said main jaws, supplemental jaws disposed in said supplemental body member and provided with lugs projecting through the side openings thereof, said supplemental body member being provided with an internal tapered jaw supporting part at its outer end, a spring acting to normally separate said supplemental jaws, and an adjusting collar threaded upon said supplemental jaw member to coact with the lugs of said supplemental jaws.

4. In a chuck, the combination of a main body member and a supplemental body member projecting into the inner end of said main body member, a set of main jaws arranged in said main body member below said supplemental body member, means for actuating said main jaws, supplemental jaws disposed in said supplemental body member, said supplemental body member being provided with an internal tapered jaw supporting part at its outer end, and an adjusting collar on said supplemental jaw member to coact with said supplemental jaws.

5. In a chuck, the combination of a main body member, a supplemental body member projecting into said main body member, a set of main jaws arranged in said main body member, means for actuating said jaws, supplemental jaws disposed in said supplemental body member, said supplemental body member having an internally tapered supporting portion for said supplemental jaws, an adjusting member for said supplemental jaws threaded upon said supplemental body member, and a spring acting to normally separate said supplemental jaws.

6. In a chuck, the combination of a main body member, a supplemental body member projecting into said main body member, a set of main jaws arranged in said main body member, means for actuating said jaws, supplemental jaws disposed in said supplemental body member, said supplemental body member having an internally tapered supporting member for said supplemental jaws, and an adjusting member for said supplemental jaws mounted upon said supplemental body member.

7. In a chuck, the combination of a body provided with jaw ways at its outer end and with a supplemental jaw chamber inwardly of said jaw ways, said supplemental chamber having outwardly converging walls at its outer end, a main set of jaws arranged in the said ways, a supplemental set of jaws arranged in said supplemental jaw chamber to coact with its tapered walls, and an independently adjusting means for actuating said sets of jaws.

8. In a chuck, the combination of a main body member and a supplemental body member projecting into said main body member, said body members having threaded engagement, a set of main jaws arranged in said main body member to be actuated by the adjustment of the said main body member on said supplmental body member, supplemental jaws disposed in said supplemental body member, and an adjusting collar threaded on said supplemental body member for adjusting said supplemental jaws.

In witness whereof I have hereunto set my hand.

HOLGER NIELSEN.